Figure 1:
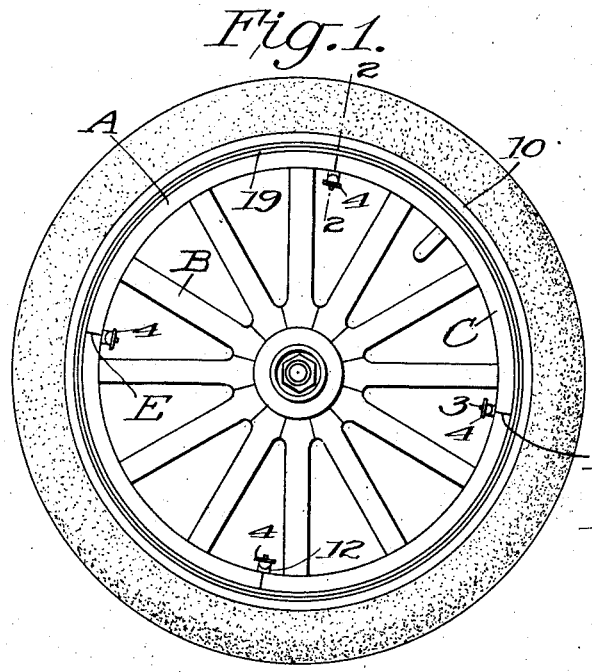

D. R. CARTER.
DEMOUNTABLE RIM.
APPLICATION FILED APR. 10, 1919.

1,329,289. Patented Jan. 27, 1920.

INVENTOR
Douglass R. Carter.

UNITED STATES PATENT OFFICE.

DOUGLASS R. CARTER, OF WASHINGTON, DISTRICT OF COLUMBIA.

DEMOUNTABLE RIM.

1,329,289.     Specification of Letters Patent.     Patented Jan. 27, 1920.

Application filed April 10, 1919. Serial No. 289,095.

*To all whom it may concern:*

Be it known that I, DOUGLASS R. CARTER, a citizen of the United States, residing in Washington, in the District of Columbia, have invented certain new and useful Improvements in Demountable Rims for Automobiles or other Vehicles, of which the following is a specification.

My invention relates to improvements in demountable rim fasteners, and it consists in the combinations, constructions and arrangements herein described and claimed.

In the ordinary operation, the removal and replacement of rims in the event of puncture or other tire troubles, involves considerable labor and time under various and, very often, unfavorable weather conditions when the saving of time is an important factor.

My device facilitates the said operations by the saving of time and labor, and at the same time provides a simple, strong and durable arrangement, inexpensive to manufacture, and easy to manipulate without the aid of tools which are necessary in the removal and replacing of rims of the ordinary style.

My invention is illustrated in the accompanying drawings in which similar reference characters indicate corresponding parts in the several views in which—

Figure 1. is a side view of an automobile wheel showing the embodiment of my invention.

Figure 2:
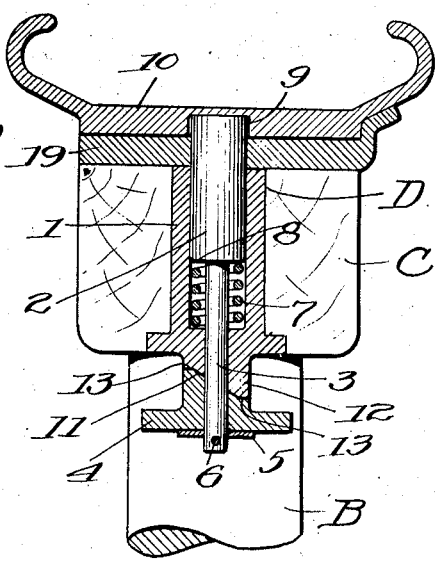
Figure 6:
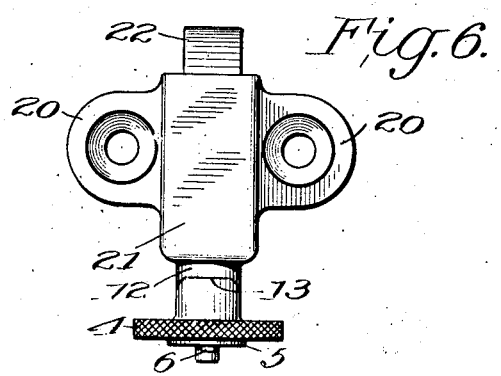

Fig. 2. is an enlarged vertical section on the line 2—2 of Fig. 1. with the rubber tire removed.

Figure 3:
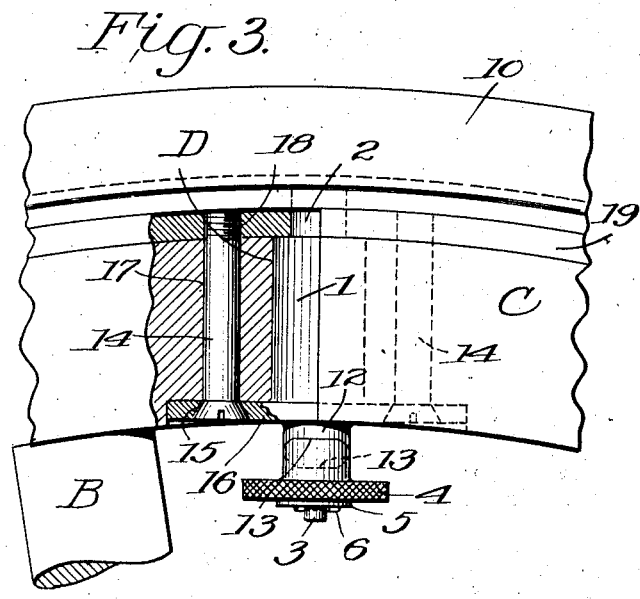

Fig. 3. is a side view of a portion of the wheel with part of the felly broken away to show the manner of securing the device to the wheel.

Figures 4, 5:
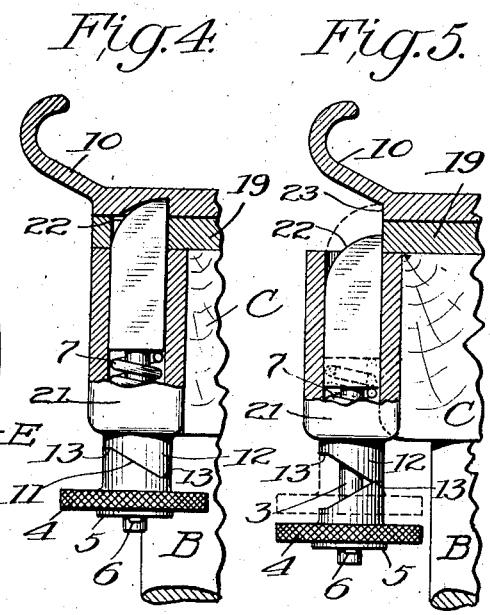

Fig. 4. is a modification showing the device applied near the outside face of the wheel.

Fig. 5. is another modified form showing the device secured to the outside face of the wheel. The locked position is indicated by the dotted lines, and to the unlocked position by the full lines to more clearly show the function of the cam members.

In carrying out my invention I provide, a wheel A with spokes B and felly C of the usual type fitted with a plurality of rim fastening devices. These fastening devices consist of a housing or casing 1, preferably cylindrical in form carrying a bolt 2, circular in cross section and made to a nice sliding fit with the inner wall of the casing 1. The bolt 2 is provided with a reduced end or stem 3 at its lower end to which is rotatively mounted a milled knob or thumbpiece 4, held in place thereon by the washer 5 and a cotter-pin 6. The bolt 2 is normally held in place by a helical compression spring 7 on the inside of the housing and encircling the stem 3 of the bolt 2, one end of the spring bearing on the bottom of the latch casing 1, and the other end against a shoulder 8 on the bolt 2 formed by the reduced portion of the said bolt, thereby forcing the bolt outwardly and into a socket 9 in the detachable rim 10.

The cylindrical shank of the knob or thumbpiece 4 is cut at about an angle of 30 degrees with the plane of the head, forming a truncated cylinder which acts as a cam 11. This cam bears upon a similar cam member formed on a boss 12 which is either cast, welded or secured in any other suitable manner to the bottom of the latch casing 1. This boss being cut on the same angle, and of the same diameter as the thumbpiece 4, and being inverted thereover, forms with it male and female cam members whose surfaces, under the tension of the spring 7, ride down one upon the other and thereby permit the bolt 1 to rest in the socket 9 of the rim 10, holding the latch in its locked engagement with the rim.

The chamfered surface of the thumbpiece 4 and al o of the boss on the housing 1 terminates at its lower and uppermost points in a flat bearing surface or shoulder 13 ground parallel with the plane of the thumbpiece head, thus forming a resting surface for the cam members to hold the bolt 2 in its disengaged position during the process of removing the rim from the wheel.

The locking devices are inserted in a series of holes D bored through the felly of the wheel at points where the sections meet, as shown in Fig. 1. of the drawing at E, and are held in place by bolts 14 passing through countersunk holes 15 in a flange 16 made on the bottom of the latch casing 1, thence through holes 17 bored through the felly of the wheel and screwing into tapped holes 18 provided in the bonding rim 19 of the wheel.

In the modified form shown in Fig. 4. the bottom flange 16 of the housing 1 already described is supplanted by lateral flanges 20 and the latch housing 21 is made square in cross section instead of circular, and is fastened into recesses cut adjacent to the outside face of the felly. The bolt is made square in this case with a rounded end 22 to easily snap under the rim and into the recess provided for it, when replacing the rim.

In the modification shown in Fig. 5, the housing is reversed to bring the flange against the outside face of the felly, and the latch rests against a shoulder 23 formed on the side of the demountable rim 10. In both modified forms the device is held on by bolts passing through the felly of the wheel parallel to the axle.

Now in the event of puncture, or for any other reason that necessitates the removal of the rim, jack up the axle in the usual way. Turn each of the thumbpieces so that the cam faces of the device will slide upon each other until the upper flat bearing surface of the thumbpiece, rests on the lower corresponding surface of the boss 12 of the casing 1. This operation withdraws the bolt from the socket thereby leaving the rim free to be pulled off from the bonding rim. When the necessary repairs are made, slip the valve through the hole in the wheel, snap the rim into place and release the thumbpieces all around. The rim is then securely fastened in place.

This requires but a very short period of time in comparison with the usual laborious method of removing and replacing rims and tires.

When the rim is securely locked in place it is impossible for it to come off by accident, for even should one become dislodged from some outside contact it is hardly conceivable that a number of the latches spaced around the wheel would all become unfastened simultaneously.

I am aware that other forms of the device, based upon the same principle, might be made, but I regard as my own all such modifications as fairly fall within the spirit and scope of the invention.

I claim—

A demountable rim fastener consisting of a body portion or casing provided on its outer surface at one end with a boss chamfered at an angle to form a cam surface flattened at its upper and lower extremities to form a bearing surface, a latching bolt inside the said casing, consisting of an enlarged end or head and a reduced part forming a stem which passes through the bottom of latch housing, a knurled knob or thumbpiece having its shank chamfered in a similar way as the boss on the latch housing and forming with the boss a male and female cam member, a helical spring around the stem of the latching bolt to retain the bolt in its locked position, a washer and cotter-pin to hold the knob on the stem of the latching bolt and a flange on the bottom of the bolt housing to provide means for securing the said housing to the felly of the wheel.

DOUGLASS R. CARTER.

Witness:
SAMUEL E. WADE.